US006511644B1

(12) United States Patent
MacArthur et al.

(10) Patent No.: US 6,511,644 B1
(45) Date of Patent: Jan. 28, 2003

(54) METHOD FOR REMOVING CONTAMINANTS IN REACTORS

(75) Inventors: Brian W. MacArthur, Redmond, WA (US); Walter A. Jessup, Seattle, WA (US); Burton Brooks, Bellevue, WA (US)

(73) Assignee: The Chemithon Corporation, Seattle, WA (US)

( * ) Notice: Subject to any disclaimer, the term of this patent is extended or adjusted under 35 U.S.C. 154(b) by 0 days.

(21) Appl. No.: 09/708,897

(22) Filed: Nov. 8, 2000

Related U.S. Application Data

(60) Provisional application No. 60/228,539, filed on Aug. 28, 2000.

(51) Int. Cl.⁷ .................................................. C01C 1/08
(52) U.S. Cl. ........................................ 423/358; 423/659
(58) Field of Search .................................. 423/358, 235

(56) References Cited

U.S. PATENT DOCUMENTS

| | | | |
|---|---|---|---|
| 3,758,572 A | 9/1973 | Jones, Jr. et al. | 260/553 B |
| 3,826,815 A | 7/1974 | Mavrovic | 423/356 |
| 3,922,222 A | 11/1975 | Van Moorsel | 210/71 |
| 4,087,513 A | 5/1978 | Schell | 423/437 |
| 4,168,299 A | 9/1979 | Schell | 423/358 |
| 4,176,168 A | 11/1979 | Goto | 423/478 |
| 4,220,635 A | 9/1980 | Schell | 423/358 |
| 4,231,960 A | 11/1980 | Schmidt | 564/73 |
| 4,308,385 A | 12/1981 | Goorden | 544/201 |
| 4,314,077 A | 2/1982 | Zardi et al. | 564/70 |
| 4,341,640 A | 7/1982 | Landis | 210/752 |
| 4,410,503 A | 10/1983 | van Nassau et al. | 423/359 |
| 4,454,333 A | 6/1984 | Jenck | 560/1 |
| 4,552,979 A | 11/1985 | Stokes | 564/69 |
| 4,652,678 A | 3/1987 | Douwes | 564/73 |
| 4,654,442 A | 3/1987 | Young et al. | 564/73 |
| 5,096,599 A | 3/1992 | Granelli | 210/750 |
| 5,223,238 A | 6/1993 | Czuppon | 423/359 |
| 5,240,688 A | 8/1993 | von Harpe et al. | 423/235 |
| 5,252,308 A | 10/1993 | Young | 423/358 |
| 5,281,403 A | 1/1994 | Jones | 423/235 |
| 5,399,325 A | 3/1995 | von Harpe et al. | 423/235 |
| 5,399,755 A | 3/1995 | Lagana | 564/63 |
| 5,281,403 A | 6/1996 | Jones | 423/235 |
| 5,543,123 A | 8/1996 | Hoffmann et al. | 423/235 |
| 5,720,926 A | 2/1998 | Whipp et al. | 422/110 |
| 5,827,490 A | 10/1998 | Jones | 423/239.1 |
| 5,985,224 A | 11/1999 | Lagana | 423/235 |
| 6,077,491 A | 6/2000 | Cooper et al. | 423/235 |
| 6,093,380 A | 7/2000 | Lagana et al. | 423/239.1 |

FOREIGN PATENT DOCUMENTS

| | | |
|---|---|---|
| DE | 3422175 | 12/1985 |
| DE | 19834980 | 12/1999 |
| EP | 0 487 886 A1 | 6/1992 |
| EP | 0 582 022 A1 | 2/1994 |
| JP | 53-052274 | 5/1978 |

(List continued on next page.)

OTHER PUBLICATIONS

Walker et al. "Application of A Urea Based Process to Generate Ammonia for the SCR at the Canal Station of Southern Energy, Inc.," ICAC Forum 2000, Institute of Clean Air Companies, Washington, D.C. (believed to have been publicly available Mar. 24, 2000).

(List continued on next page.)

*Primary Examiner*—Wayne A. Langel
(74) *Attorney, Agent, or Firm*—Marshall, Gerstein & Borun

(57) ABSTRACT

The invention provides a method and apparatus for maintaining the operation of reactors by removing contaminant matter arising from the solid reactant(s) used as a feedstock in such systems, by either intermittent or continuous means.

31 Claims, 5 Drawing Sheets

FOREIGN PATENT DOCUMENTS

| | | |
|---|---|---|
| JP | 59-082987 | 5/1984 |
| JP | 63-198713 | 8/1988 |
| JP | 63-224785 | 9/1988 |
| JP | 02-191528 | 7/1990 |
| JP | 02-268811 | 11/1990 |
| JP | 08-057258 | 3/1996 |
| JP | 08-071372 | 3/1996 |
| JP | 09-294913 | 11/1997 |
| JP | 11-171535 | 6/1999 |
| SU | 239863 | 8/1969 |
| WO | WO 92/02291 | 2/1992 |
| WO | WO 95/09810 | 4/1995 |
| WO | WO 98/42623 | 10/1998 |
| WO | WO 99/61136 | 12/1999 |
| WO | WO 00/07695 | 2/2000 |

OTHER PUBLICATIONS

Glesmann et al. "Design and Operation of a Safe Alternative to Anhydrous Ammonia: Urea–Based Ammonia–on–Demand (AOD™) at AEP's Gavin Station," Air and Waste Management Association, The U.S. EPA/DOE/EPRI Combined Power Plant Air Pollutant Control Symposium: "The Mega Symposium" and the A&WMA Specialty Conference on Mercury Emissions: Fate, Effects and Control (believed to have been publicly available Aug. 21, 2001).

International Search Report for PCT/US01/41817 dated Mar. 21, 2002, mailed Mar. 28, 2002.

Kucheryavyi et al.; Kinetics of the Hydrolysis of Urea at High Temperatures in Relation to Purification of Waste Waters in Urea Manufacture; translated from Zhurnal Prikladnoi Khimii, vol. 42, No. 7, pp. 1596–1600, Jul., 1969.

METHOD FOR REMOVING CONTAMINANTS IN REACTORS

CROSS-REFERENCE TO RELATED APPLICATION

This application claims the benefit under 35 U.S.C. §119(e) of U.S. Provisional Patent Application Serial No. 60/228,539 filed Aug. 28, 2000.

BACKGROUND OF THE INVENTION

1. Field of the Invention

The invention relates generally to systems for controlling the presence of contaminants in chemical reaction systems and, more particularly, the invention relates to methods and apparatus for removing contaminants found in urea hydrolysis reactors and others wherein contaminants are formed in the course of an ongoing reaction.

2. Description of Background Technology

The Problem of Contaminant Formation

Solid urea is available in several commodity grades destined for uses either in agricultural applications as fertilizers or in chemical process for production of urea-formaldehyde resins and thermosetting polymers. Solid urea is available in bags or bulk quantities, and is commonly transported in bulk truck or railcar loads. Urea is a non-hazardous material, and affords a safe starting material in certain process requiring gaseous ammonia as, for example, in processes for removal of nitrogen oxides from the tail gas stream of combustion processes, such as in fuel-fired boiler operations in public electric power generation plants. Such processes use gaseous ammonia in Selective Catalytic Reduction (SCR) or Selective Non-Catalytic Reduction (SNCR) methods for removal of nitrogen oxides. Another example is the use of gaseous ammonia to treat fly ash in the tail gas system of a fuel-fired boiler in a public electric power generation plant. Such treatment is beneficial for collection of the fly ash. Common alternatives to use of urea include use of anhydrous ammonia or of aqueous ammonia, both of which are hazardous chemicals presenting serious risks in the transport, handling, storage, and use with attendant regulatory compliance requirements.

Urea may be hydrolyzed to form gaseous ammonia for such uses. Such processes typically employ solid urea supplied in bulk quantities, and of a composition readily available as a commodity. Solid urea is a relatively soft solid that is hygroscopic, which may cause problems in handling it in a highly pure form. Therefore, it is a common practice in the industry to add certain chemical compounds to the solid urea to improve its physical properties and to improve handling characteristics of a granulated or prilled urea product. Such additives include but are not limited to those disclosed in Belasco et al. U.S. Pat. No. 3,248,255 (gaseous formaldehyde to form urea-formaldehyde resin surface coating), Van Hijfte et al. U.S. Pat. No. 4,160,782 (dimethylurea and/or trimethylolurea), Elstrom et al. U.S. Pat. No. 4,204,053 (formaldehyde), Blouin U.S. Pat. No. 4,587,358 (lignosulfonates), Gallant et al. U.S. Pat. No. 5,102,440 (urea-formaldehyde compounds), and Kayaert et al. U.S. Pat. No. 5,653,781 (formaldehyde, methylolureum (methylolurea), urea-formaldehyde pre-condensates, or hexamethylenetetramine), the disclosures of which are incorporated herein by reference.

Such additives are typically present in the solid urea in concentrations up to 2 wt. %. Therefore, during the continuous use of such solid urea in a hydrolysis reactor designed to produce gaseous ammonia, the solid urea is first dissolved into an aqueous solution, commonly in the concentration range 20 wt. % to 78 wt. %, preferably in the range 40 wt. % to 60 wt. %, and while the urea is continuously decomposed to ammonia and carbon dioxide and leaves the reactor in a gaseous form, the additives present in the solid urea accumulate and may undergo various chemical reactions that form, along with unreacted additives, a contaminant mass in the reaction mixture.

Several specific process systems have been described and patented with the intent to generate a gaseous stream of ammonia, carbon dioxide, and water vapor at a temperature and pressure useful for removal of nitrogen oxides or treatment of fly ash as described, or for other process applications. Young (U.S. Pat. No. 5,252,308) describes a process system that performs the hydrolysis reaction using aqueous solutions of urea in the presence of catalyst systems, specifically mixtures of ammonium salts of certain polyprotic mineral acids, such as phosphoric or sulfuric acid. Cooper et al. (U.S. Pat. No. 6,077,491) describe a urea hydrolysis process that does not require a catalyst and that may take a variety of forms in the apparatus. Lagana (U.S. Pat. No. 5,985,224) describes a process that employs steam-stripping in the hydrolysis reactor to promote the reaction. The disclosures of Young (U.S. Pat. No. 5,252,308), Cooper et al. (U.S. Pat. No. 6,077,491) and Lagana (U.S. Pat. No. 5,985,224) are incorporated herein by reference.

These processes do not recognize the potential problems that may arise from the accumulation of a contaminant mass in the reactor, nor do they describe why such a contaminant may arise, nor do they provide means to address this contaminant. It is the intent of the invention to describe some of the reasons why contaminants arise in the reactor vessels of the various process systems, and to describe the means to address these contaminants so that maintenance-free urea hydrolysis operation can be achieved or at least the maintenance-free period of operation extended and contaminants removed without the hazards and inconvenience of shutting the system down and opening the reactor vessel for frequent cleaning.

SUMMARY OF THE INVENTION

It is an objective of the invention to provide technology for maintaining the operation of reactors by incorporating means to remove soluble and/or insoluble contaminant matter, either intermittently or continuously, from the reaction system.

According to the invention, a method of controlling the amount of such contaminants in a liquid phase reaction mixture in a reaction vessel includes the steps of withdrawing a portion of the reaction mixture containing such soluble and/or insoluble contaminants from the liquid phase and the reaction vessel, separating at least one contaminant from the remainder of the withdrawn portion of the reaction mixture, and recycling at least a portion of the withdrawn reaction mixture to the liquid phase in the reactor vessel.

The invention also provides apparatus for carrying out a chemical reaction in a liquid phase containing such contaminants, including a reactor vessel, means for withdrawing a portion of the reaction mixture from the reactor vessel, means for separating contaminants from the remainder of the withdrawn portion of the reaction mixture, and means for recycling any desired portion of the remainder of the withdrawn portion of the reaction mixture to the reactor vessel.

While the invention will be described with reference to the exemplary urea hydrolysis reaction system, the invention is applicable generally to reaction systems that produce or accumulate soluble and insoluble contaminants during the course of the reaction.

DETAILED DESCRIPTION OF THE INVENTION

Figure 1:
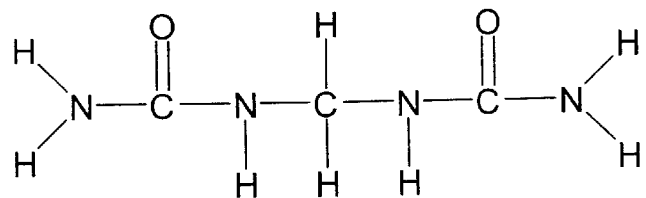
FIG. 1 illustrates the molecular structure of methylene di-urea.
Figure 2:
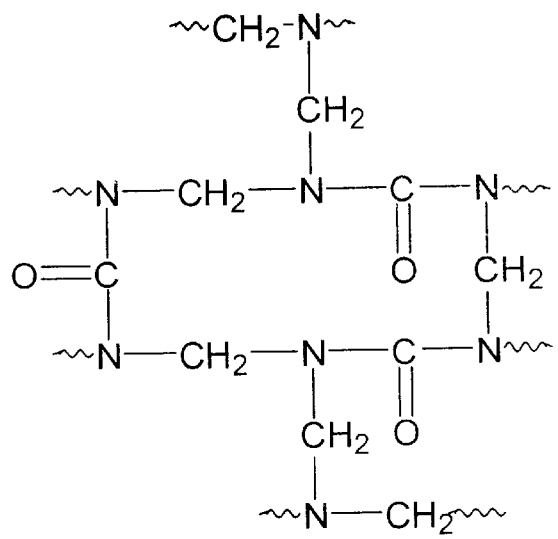
FIG. 2 illustrates the molecular structure of a urea-formaldehyde resin.

Generally, a contaminant is any undesirable substance present in a reactor. Put another way, a contaminant is any substance present in a reactor that impairs the short-term or long-term operation of the reactor. A contaminant can be defined as any substance present in a reactor that is not a reagent, reactant, intermediate, product, solvent, indicator, or catalyst of a desired reaction in the reactor, or a mechanical component of the reactor itself. A contaminant can be introduced into the reactor directly (e.g., mixed with a reagent) or indirectly (e.g., formed by reaction with another contaminant or non-contaminant or formed by thermal decomposition).

The invention is particularly useful in various methods for production of ammonia by hydrolysis of urea, whether or not such hydrolysis is conducted with a catalyst present in the urea hydrolysis reaction mixture. According to this embodiment of the invention, in order to extend or indefinitely sustain the continuous operation of the urea hydrolysis process, means to remove the by-product contaminants in the reaction mixture are provided. Without such means, operation of a urea hydrolysis system would be interrupted to enable physical cleaning of the reactor, which is complicated by the presence of ammonia and its associated chemical hazards. Separation of the contaminant matter may be performed intermittently or continuously in accordance with the invention. Various means to enhance separation of contaminants are described.

Solid urea is commonly manufactured with certain urea-formaldehyde additives present in concentrations up to 2 wt. %. These compounds are added to enhance the handling characteristics of the urea. The additives reduce the tendency to form fine dust and reduce the hygroscopic behavior, which causes particles to form into clumps and cakes. Additives may be urea-formaldehyde oligomers or resins that have been partially polymerized, such as that referred to by the manufacturer's trade name UF-85. For example, in at least one process, a urea-formaldehyde compound is added to the urea while the urea is in a molten state, and is believed to react with the UF-85 additive to form methylene di-urea (MDU, FIG. 1), which imparts the desired physical properties to the final urea composition in the dry solid form.

Another additive is a type of saponate supplied under the trade designation UREASOFT by Kao Corporation. UREASOFT additive is generally applied to the surface of prilled urea just before storage as an aid in product storage and handling.

Preferred conditions in a urea hydrolysis reactor, according to various patented processes, are limited to fairly narrow ranges of temperature and pressure. Thus, in Cooper et al. the reactor preferably operates at about 150° C. to about 155° C. and 75 psig to 90 psig, while in Lagana the reactor preferably operates at 195° C. and 200 psig to 275 psig.

Young describes a process that utilizes a catalyst in the aqueous solution, and states that the reactor temperature must be at least 150° C., preferably in the range 150° C. to 200° C. The vapor pressure of pure water in this temperature range is 70 psig to 225 psig and, thus, the generalized range of conditions described in the Cooper et al. and Lagana patents overlaps the operating conditions first described by Young.

Therefore, it can generally be said that such hydrolysis reactors operate preferably in the range from about 150° C. to 195° C. and about 75 psig to 275 psig. All of these processes employ aqueous solutions of urea, which typically fall in the concentration range 50±15 wt %, commonly about 50 wt %.

Under these conditions the urea hydrolysis reaction occurs according to the well-known mechanism:

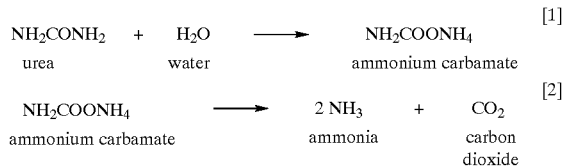

These reactions taken together are endothermic, requiring a constant supply of heat to the hydrolysis reactor to sustain the reaction. The ammonia and carbon dioxide produced are formed as gases, which are released from the aqueous solution of liquid reactants. Bubbles containing ammonia, carbon dioxide and water vapor are released into the liquid by the chemical reaction, and rise in the liquid to eventually coalesce into a bulk gas phase. The reactors therefore have a common tendency to form a foamy cuff layer in which the bubbles of gas gradually break and release trapped gases into a bulk gas phase. The urea is converted to ammonia and carbon dioxide gases, which are discharged from the reactor.

However, the additives present in the urea composition must also be considered. It is illustrative to consider the presence of methylene di-urea, a compound known to be present in solid urea. This compound arises as a consequence of adding UF-85, for example, to the urea as previously described.

Methylene di-urea has a chemical structure shown in FIG. 1, and in the urea hydrolysis reactor may combine with a water molecule to release urea and formaldehyde, according to the following reaction:

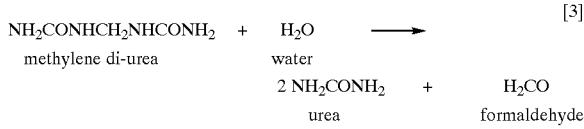

Formaldehyde is a volatile compound and will tend to leave the liquid phase governed by its vapor-liquid equilibrium at the conditions in the system. Sufficient pressure may exist to sustain a significant concentration in the liquid phase, enabling reaction of the dissolved formaldehyde and urea. A possible mechanism for such reaction may follow the mechanism known to form the urea-formaldehyde resins, thus:

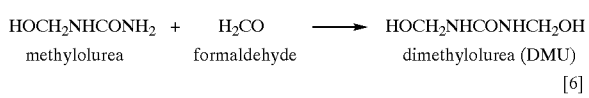

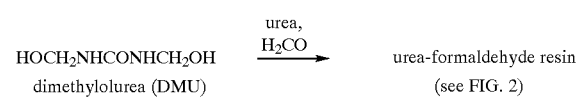

Reactions 4, 5, and 6 illustrate the combination of urea and formaldehyde into large polymeric structures by a familiar reaction mechanism (Morrison and Boyd, *Organic Chemist*, $2^{nd}$ Ed., Allyn and Bacon, Inc., Boston 1966, p. 923).

Oligomers of urea-formaldehyde reaction products may be applied to solid urea by various means to impart desirable handling characteristics, and the urea-formaldehyde oligomers may react to form dimethylolurea or may retain their original structure to one degree or another. Use of such solid urea in the urea hydrolysis process would result in continuous dosing of the reactor solution with oligomers of urea-formaldehyde resin, which could continue to react and to grow in mass according to the reactions 4, 5, and 6.

While such reactions as 4, 5, and 6 are normally carried out with relatively pure reactants in processes intended to produce urea-formaldehyde resins and molded plastics, the mechanism may also explain the appearance of a semi-solid to solid contaminant matter in the urea hydrolysis reactor wherein the urea, formaldehyde and intermediates are all present in the aqueous reactant solution. It is likely that the concentration of the reactants, as well as the temperature, pressure, and pH of the solution have an effect on the reaction rate. However, formation of large oligomers of urea-formaldehyde polymer in the reactor with no means of removal will eventually result in serious contamination and present an impediment to continued operation.

Polymers, such as urea-formaldehyde reaction products, will vary in molecular weight or polymer chain length, and will exhibit water solubility for the smaller oligomers, and relative insolubility as the size of the oligomer molecule increases. Large polymer molecules may therefore separate as a distinct phase in the urea hydrolysis reaction mixture. When the polymer density is less than that of the aqueous solution, the polymer will tend to collect on the surface in the frothy layer where bubbles of gases are coalescing and breaking to release ammonia and carbon dioxide. The compounds may affect the rate of foam-breaking in the reactor, and cause problems in disengaging the product gases from the aqueous reaction mixture. When the polymer density is greater than that of the aqueous solution, the polymer will tend to sink and collect on the bottom of a reactor vessel.

Other additives have been reported, such as saponates (e.g., UREASOFT) and lignosulfonates, which also would be retained in the urea hydrolysis reactor if present in the feed urea. Lignosulfonates are mentioned with reference to urea products destined for use as fertilizers, and may not be as prevalent in urea products for chemical process applications. Nevertheless, both lignosulfonates and saponates will exhibit affinity for the liquid-vapor interface, and may reduce the surface tension of the liquid reaction mixture in this area. The effect would be to enhance the foam stability in the reactor, and as more of the material is accumulated, a contaminant mass may become isolated in a preferred location in the reactor just as in the case described previously. Therefore, a similar means of removal will be required.

Other potential contaminant masses include polyamides, such as polyacrylamides. The following mechanism is proposed.

The proposed route starts with reaction of urea in the aqueous solution to form ammonium carbamate, which in turn partially decomposes to ammonia and carbamic acid. Carbamic acid can react with urea in a condensation polymerization reaction to form the polyamide compounds.

The chemical reactions are as follows:

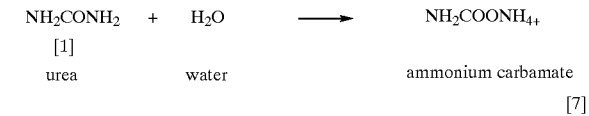

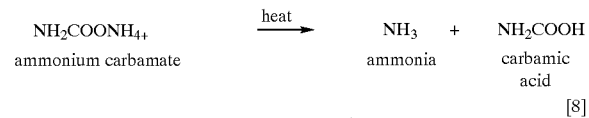

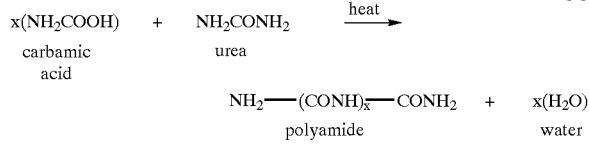

wherein x is a variable integer greater than zero.

Figure 3:
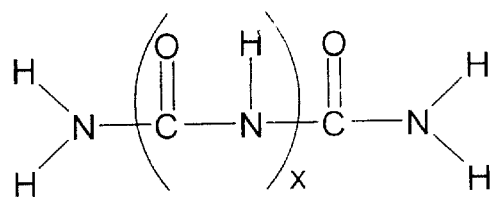
FIG. 3 illustrates the molecular structure of a potential polyamide contaminant

The molecular structure of a potential polyamide contaminant is illustrated in FIG. 3.

This mechanism illustrates how certain species likely to be present in the urea hydrolysis reactor may combine to form a polyamide compound. In the reaction mixture, the polymerization process can continue to increase the molecular weight of the polyamide compound until it is no longer soluble in the solution and separates into a contaminant phase. An interesting aspect of this type of contaminant is that it may arise even if purified urea were used in the hydrolysis reactor, provided that conditions were favorable to the formation of carbamic acid. Amides are formed by the reaction of carboxylic acids and amines, and therefore other carboxylic acids, if present in the reaction mixture, could potentially undergo a reaction analogous to the mechanism shown above and yield a similar polyamide compound.

Other contamination problems may arise from trace compounds present in the process water or the solid urea, which would accumulate under continuous operation over longer periods of time. For example, certain metals may be present in urea in small amounts, such as Fe, Cd, Cr, Pb, As, and Hg, and ash may be present at concentrations in the range 0.001 wt % to 0.01 wt %. The process water may contribute calcium hardness and other minerals or solids. Furthermore, the means of transporting, handling and dissolving the solid urea may introduce contaminants from the environment or from contact with the equipment that is used.

Figure 4:
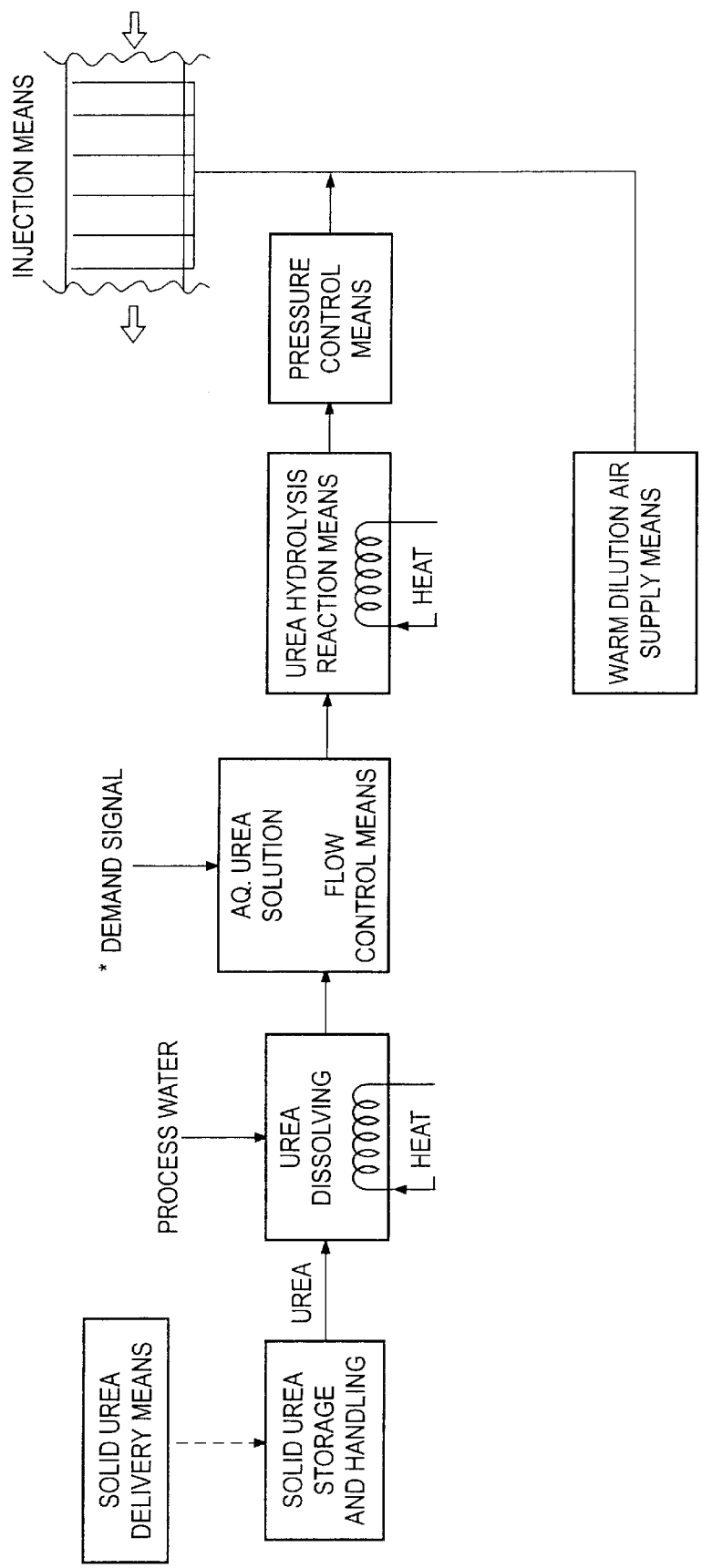
FIG. 4 illustrates a urea hydrolysis process system with which the methods and apparatus of the invention are useful.

A urea hydrolysis process is illustrated in FIG. 4, which shows the major elements of the process system and essential process controls. The system in a generalized embodiment will include means for delivering solid urea, facilities for storing and handling bulk solid urea, means for dissolving solid urea in process water to produce a solution at a controlled concentration and temperature, means for controlling the flow of aqueous urea to the hydrolysis reactor in response to an external demand signal, a urea hydrolysis reaction means (e.g., a reactor vessel), means for controlling the reactor pressure by controlled discharge of the produced gases, and means for supplying warm dilution air to mix with the produced gases and conveying the said second mixture to an injection manifold and injection probe array. The produced ammonia, carbon dioxide, and water vapor mix into the warm air and the conduit is heated to maintain the temperature at or above about 60° C. to avoid the formation of ammonium carbonate salts. The hydrolysis reactor must be heated to sustain the endothermic reaction, and at the temperature of the reaction the vapor pressure of water requires a design able to sustain pressures in the range 50 psig to 300 psig. In some embodiments, the reactor vessel may have provision for injection of steam to promote stripping of the ammonia from the aqueous solution. In some embodiments a portion of the reactants may be removed from the reactor and recycled back to the urea-dissolving step or just ahead of the aqueous urea flow control means or elsewhere.

Contaminants may arise in the urea hydrolysis reaction mixture from reactions of pure urea, such as the formation and/or accumulation of polymers such as polyamides, or as a consequence of minor ingredients added to the solid urea, which may give rise to formation and/or accumulation of contaminants including saponates, ligno-sulfonates, urea-formaldehyde oligomers, urea-formaldehyde polymers, or other compounds or reaction products derived from such additives in as-supplied solid urea. As a consequence of the density of a contaminant component being different from that of the aqueous solution of reactants, a layer of relatively high concentration of contaminant tends to form on top of the liquid phase in the reactor or sink in the bottom of the reactor vessel. The design of the means for removing this material should take into consideration the design of the reactor vessel, and the capacity of the reactor to restrict the location where the contaminant matter tends to accumulate.

Figure 5:
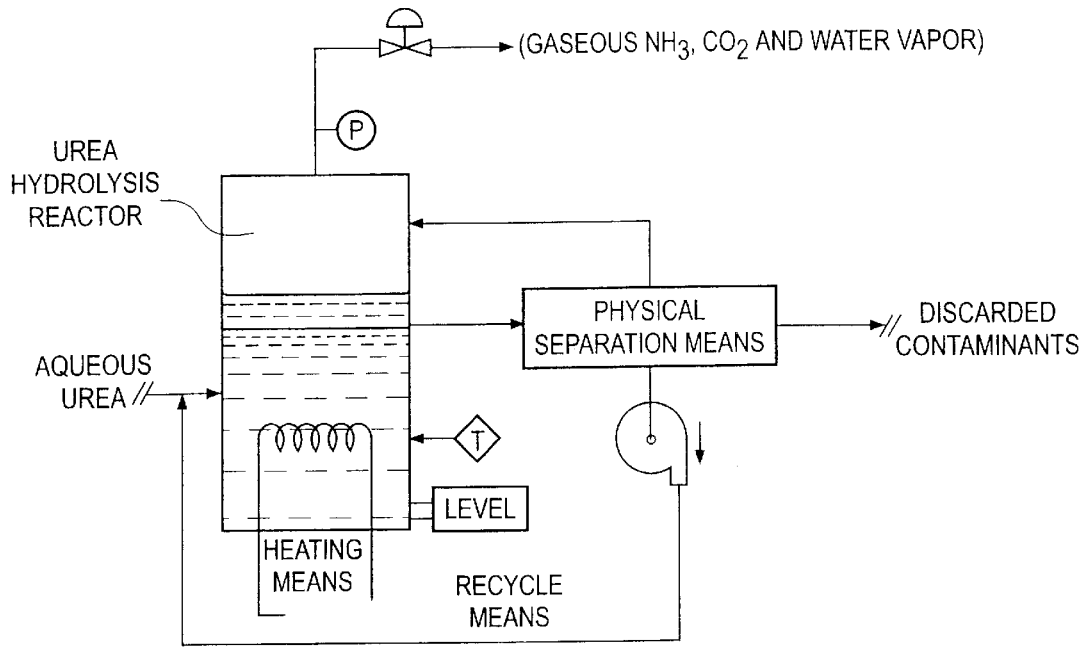
FIG. 5 illustrates an embodiment of a system for removing insoluble contaminant material from a urea hydrolysis reactor according to the invention.

In a fundamental description, the invention provides for the continuous or intermittent removal of a portion of the reaction fluid mixture from the reactor vessel and from a position within said reactor vessel where the solid and semi-solid contaminants tend to form and/or accumulate, so that said contaminants may be efficiently separated and removed from the reaction fluids. The fluids may then be pumped back into the reactor vessel. An embodiment of the process is illustrated in FIG. 5. Various means for separating the insoluble matter may be employed in the invention, including but not limited to such devices as strainers, filters, decanters, coalescing filters, settlers, centrifuges, and other mechanical separators, and combinations of such devices. The selection of the devices will depend upon the characteristics of the contaminant(s) in relation to the aqueous reaction fluid mixture, the flow rate of the side stream being treated, and the total quantity of contaminant(s) present in the stream. It is desired to provide an improved process system capable of continuous or extended maintenance-free operation of the urea hydrolysis system, and requiring only occasional attention by the system operator.

Figure 6:
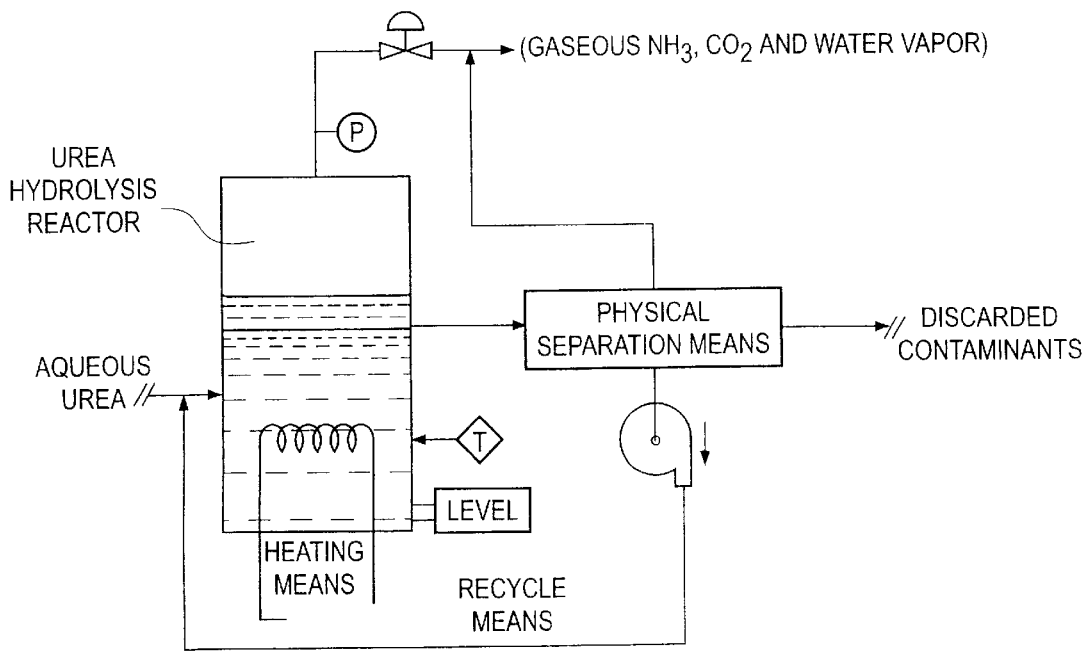
FIG. 6 illustrates an embodiment of a system for removing insoluble contaminant material from a urea hydrolysis reactor according to the invention.

In a preferred embodiment of a contaminant control means according to the system of FIG. 5, which focuses on separation of a contaminant material with distinct physical properties from the aqueous reaction mixture, it may be assumed that a urea hydrolysis reactor is designed to enable the collection of the contaminant at a predictable location in the vessel. Such a design might be an upright cylindrical vessel with volume for the liquid phase and volume for a contained gas phase. Since one contaminant material is found to float upon the aqueous reaction mixture as a distinct phase, effective removal may be effected by skimming off the contaminated fluid layer in a desirable location, such as from the surface of the liquid phase or in layers formed directly beneath the surface, for example. The skimmed fluids containing the contaminant matter may be forced along a flow path by the pressure of the reactor vessel under its normal operating pressure. The side-stream of skimmed fluid is thus forced through a mechanical separation device, which may be a filtration device which captures the contaminant, or which may separate the contaminant and continuously discharge it as a distinct stream. Examples of the latter type of device include a continuous centrifuge or a decanter. The cleaned reactant mixture is then returned to the reactor by means of a suitable process pump and fluid conduit. The fluid conduit may attach to the reactor vessel or the fluid conduit for the inlet aqueous urea solution or at some other location upstream, so long as the material is recovered and recycled to the reactor. The gaseous outlet from the physical separation means can be in communication with the reactor vessel, as shown in FIG. 5, or with the gaseous product conduit downstream of pressure control means, as shown in FIG. 6.

The skimmed material can be diluted using water or, alternatively, with an aqueous urea solution, such as a solution having the same or similar composition as the inlet aqueous urea feed solution. The temperature of the skimmed material may be adjusted upwardly or downwardly to enhance separation of contaminants. For example, by lowering the temperature of the skimmed material, the contaminant mass may solidify, enhancing the performance of solid filtration devices. Conversely, by maintaining the material at a sufficiently high temperature to melt contaminant components, separation of the contaminant liquid from the aqueous solution by decanting is improved. In particular, it has been discovered that at least one component of the contaminant mass melts at a temperature of about 100° C. Furthermore, it has been discovered that in a temperature range of about 100° C. and higher a contaminant floats in a reaction mixture prepared with phosphoric acid catalyst, thus aiding in separation of the contaminant liquid from the aqueous reaction mixture by decanting. Allowing a tar-like contaminant to freeze when decanting is undesirable, since the solid particles would adhere to surfaces in the decanter and would accumulate, leading to problems sustaining the performance of the decanter. The aqueous urea or dilution water stream can be heated or cooled to effectuate temperature control in the separation operation.

Salts of ammonia increase in solubility as the temperature of a solution increases. Salts of calcium decrease in solubility as the temperature of a solution increases. This difference in solubility can be used to separate accumulating calcium salts by filtering or decanting the skimmed material at higher temperatures, where ammonia salts are soluble and calcium salts are not.

Similarly, if the reactor vessel is segmented or poorly agitated, contaminants may tend to collect at several locations, requiring a plurality of connection points where a side-stream can be drawn off and a skimming action effected to remove the contaminant.

If the vessel is so thoroughly agitated that the insoluble material is dispersed throughout the reaction mixture, then the location of one or more take-off points for the side streams may be determined for convenience, and generally a low point in the vessel is desirable.

In all cases the flow rate of the side stream will be sufficient to turn over the entire contents of the reaction vessel within a certain time. The rate of accumulation of the contaminant is directly proportional to the consumption of the solid urea, which is known to the designer, and the quantity of fluid in the reactor is also known. These parameters enable the designer to set a side stream flow rate that will control the contaminant concentration in the system. Preferably, the removal efficiency should be designed to exceed the contaminant formation and accumulation rate.

Figure 7:
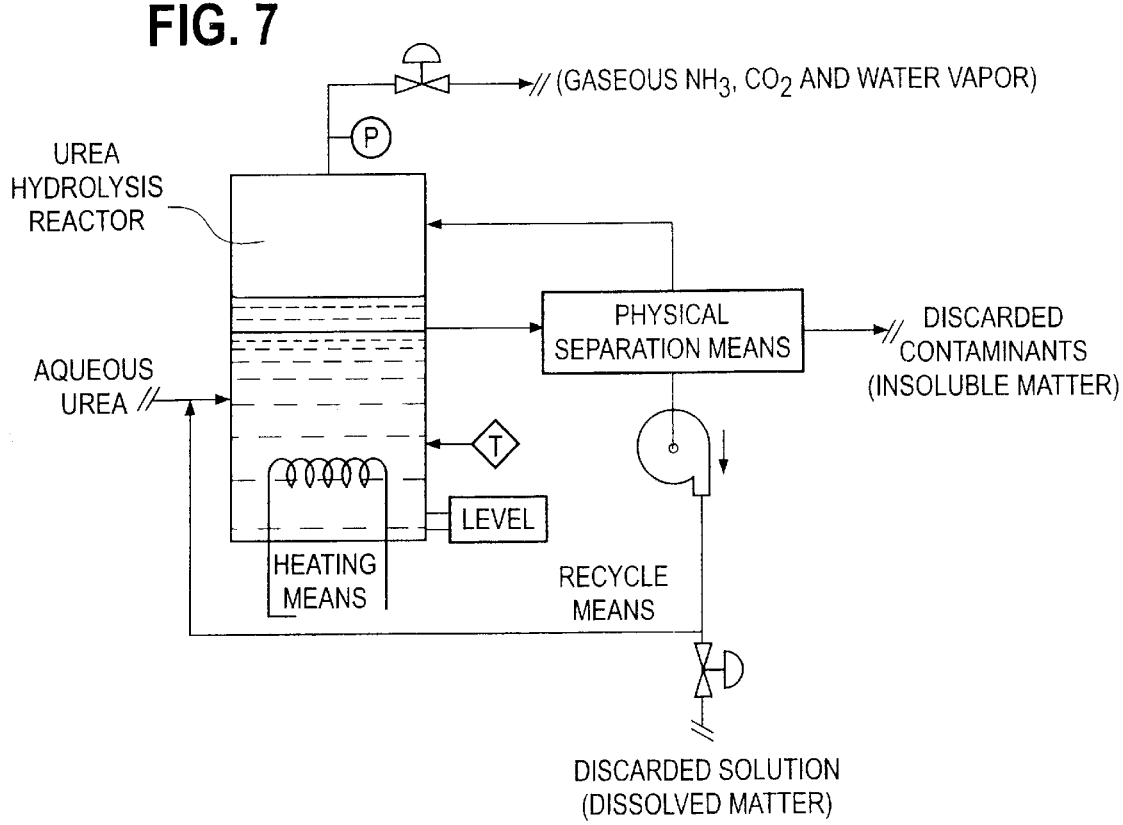
FIG. 7 illustrates an embodiment of a system for removing soluble and insoluble contaminant materials from a urea hydrolysis reactor according to the invention.
Figure 8:
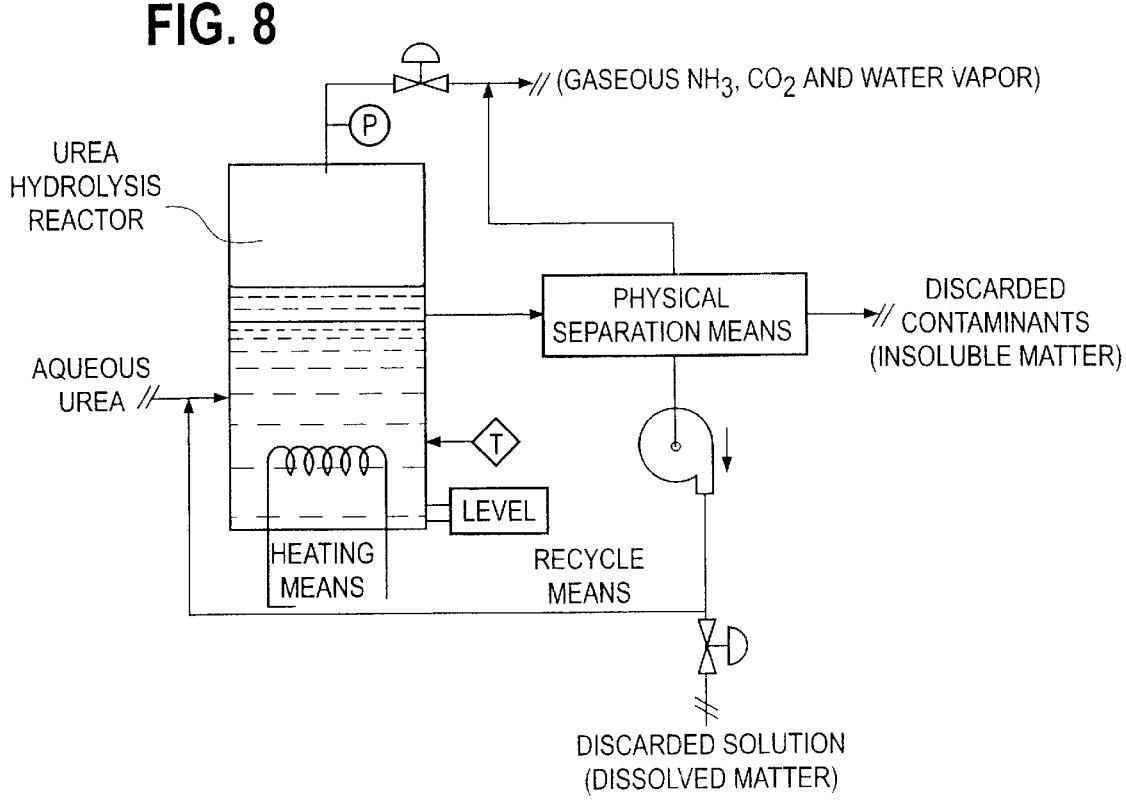
FIG. 8 illustrates an embodiment of a system for removing soluble and insoluble contaminant materials from a urea hydrolysis reactor according to the invention.

In a second fundamental embodiment of the invention, a portion of the stream removed from the reactor is deliberately discarded and the volume of the discarded fluid is replaced by fresh reaction fluids, as shown in FIG. 7, enabling either continuous or intermittent removal of dissolved contaminants as well as removal of the insoluble contaminants, thereby providing means to control the maximum concentration all such contaminants may reach in the hydrolysis reactor. In this instance, the quantity of material to be discarded and the frequency of such discharge may be determined for the convenience of the operation. Generally, intermittent discharge of small quantities would require a certain frequency of such discharge to control the concentration in the reactor to a set maximum level. Larger quantities would require less frequent discharge. In one example of the method, a small portion of the side stream may be continuously discharged as a waste stream to maintain the contaminants at an acceptable equilibrium concentration. As with the embodiments depicted in FIGS. 5 and 6, the gaseous outlet from the physical separation means can be in communication with the reactor vessel, as shown in FIG. 7, or with the gaseous product conduit downstream of pressure control means, as shown in FIG. 8.

In an example of a preferred embodiment the process illustrated in FIG. 7, which provides means to remove insoluble contaminants and also dissolved contaminants, the devices of the process embodiment of FIG. 5 will include provision to discharge a portion of the side stream and to replace this material with fresh fluid reactants from a source of said make-up fluid. This accomplishes a "blow down" or step reduction of the contaminants and is the most direct means to control the build up of trace contaminants. The quantity of material removed and replaced is set by the needs of the system and very much depends on the consequences of the contaminant in the system.

Figure 9:
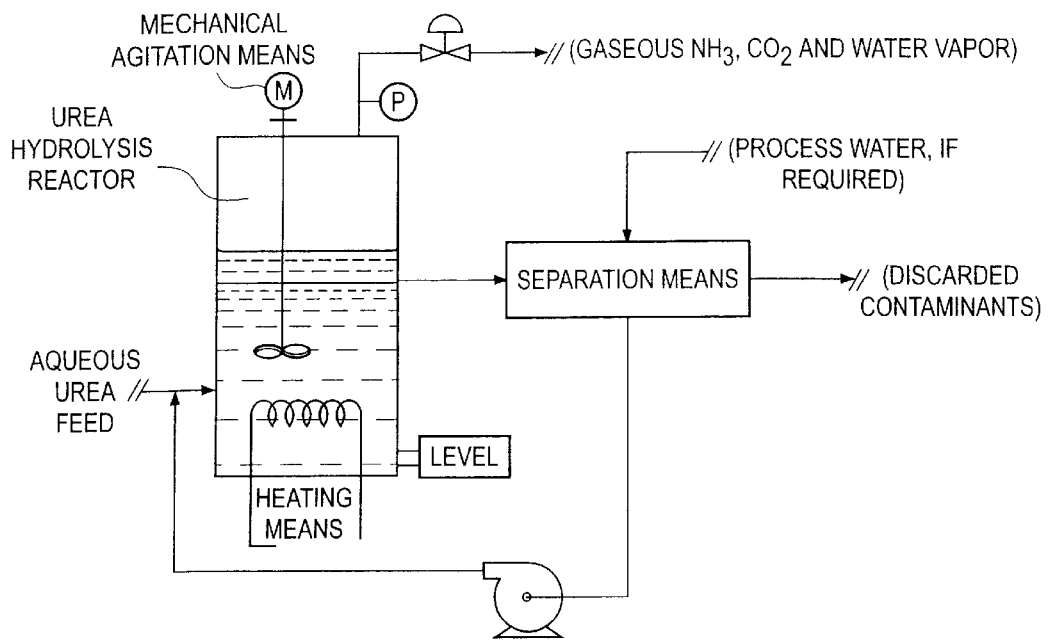
FIG. 9 illustrates an embodiment of a system for removing soluble and insoluble contaminant materials from a urea hydrolysis reactor that contains a dissolved or solid dispersed catalyst according to the invention.

FIG. 9 illustrates an embodiment of a system for removing soluble and insoluble contaminant materials from a urea hydrolysis reactor that contains a dissolved or solid dispersed catalyst according to the invention. This method has all of the features of that previously described in FIG. 7, with the addition of a process step in which process water is added to the side-stream as part of the treatment step to remove the contaminants. When a dissolved or solid dispersed catalyst is present in the process fluid reaction mixture the separation of contaminants may benefit from dilution of the aqueous solution as part of the contaminant removal step. Purified process water is used to make the aqueous urea feed solution, and therefore a portion of said process water may be used as a diluent in the contaminant removal step, provided this quantity of water is measured and accounted for in the process control system. The concentration and the solubility of the dissolved catalyst compounds will determine whether such dilution is beneficial. For example, dilution may be beneficial when a dissolved catalyst might otherwise crystallize and form a solid dispersed phase in the withdrawn liquid reaction mixture if the pressure and/or temperature of the mixture is reduced relative to conditions in the reactor. In addition, it may be beneficial to adjust the temperature of the side stream to enhance removal of contaminants, and such temperature adjustment may also be conducted as part of the processing method according to the invention. After such separation of contaminants has been completed, the balance of the side-stream is recycled to the liquid reaction mixture by means of a recycle pump and fluid conduit.

Figure 10:
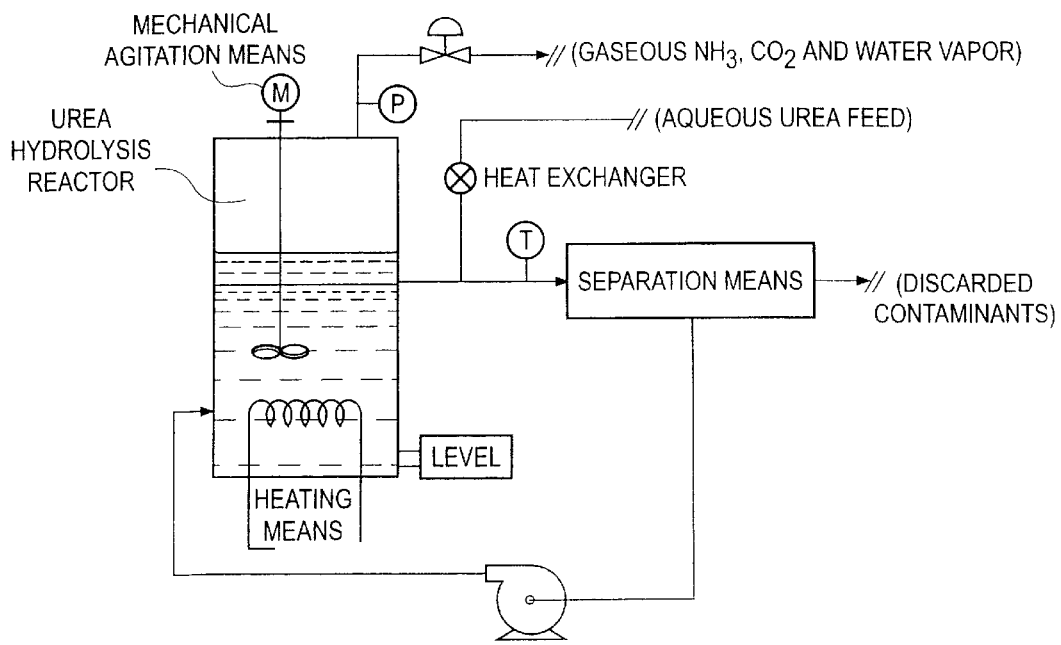
FIG. 10 illustrates an embodiment of a system for removing soluble and insoluble contaminant materials from a urea hydrolysis reactor that contains a dissolved or solid dispersed catalyst according to the invention.

FIG. 10 illustrates an embodiment of a system for removing soluble and insoluble contaminant materials from a urea hydrolysis reactor that contains a dissolved or solid dispersed catalyst according to the invention. This method is a variation on that previously described in connection with FIG. 9. The aqueous urea feed is heated and combined with a side stream from a urea hydrolysis reactor as part of the treatment step. The addition of aqueous urea feed at this point in the process serves to dilute the process fluid reaction mixture with respect to the concentration of a dissolved or solid dispersed catalyst. As with the method described in connection with FIG. 9, it may be beneficial to adjust the temperature of the side stream to enhance removal of contaminants, and such temperature adjustment may also be conducted as part of the processing method of the invention.

Uses for the discharged material should also be considered. The reaction mixture from the hydrolysis reactor will likely contain water, urea, ammonia, polymers, such as a polyamide and/or a urea-formaldehyde derivative, polymerization intermediates and oligomers, both dissolved and suspended, and many minor contaminants introduced with the reactants. The stream should be treated as a hazardous waste stream, and may be chemically treated or combined in a safe manner with other solid wastes, such as the ash from a fuel-fired boiler combustion process.

The removal of such trace contaminant material need only be considered as a feature of the system when such contaminants are present in the feed materials and a significant impact on the process performance is observed within an unacceptably short period of operation. Provided that purified water is employed, the trace contaminants in the urea and those that enter the system from the environment, if any, may not present a serious problem, and may be dealt with effectively by regular cleaning of the reactor, for example on an annual basis.

Fouling of the interior metal surfaces and particularly heat transfer surfaces within the urea hydrolysis reactor by deposits of solids may present a more difficult problem. Means to control such deposits may require more frequent cleaning of the reaction fluid, agitation of the reaction fluid to increase the shear forces at solid surfaces, and controlling the liquid level inside the reactor to insure that heated surfaces are at least substantially submerged in the fluid at all times. Agitation may be accomplished by any suitable means, including but not limited to one or more mechanical agitators, gas injection, and steam injection.

The foregoing detailed description is given for clearness of understanding only, and no unnecessary limitations should be understood therefrom, as modifications within the scope of the invention may be apparent to those skilled in the art.

We claim:

1. A method of controlling the amount of soluble and/or insoluble contaminants present in a liquid reaction mixture contained in a reactor vessel and comprising a liquid phase having a surface, said reaction mixture containing urea dissolved in water with said contaminants being formed and/or accumulated during the course of a urea hydrolysis reaction, said method comprising the steps of:

(a) withdrawing a portion of the reaction mixture containing said soluble and/or insoluble contaminants from the liquid phase and the reactor vessel; and, (b) separating at least one contaminant from the remainder of the withdrawn portion of the reaction mixture and recycling at least a portion of the remainder of the withdrawn reaction mixture to the liquid phase in the reactor vessel.

2. The method of claim 1 wherein an insoluble contaminant accumulates on the surface of the liquid phase and said insoluble contaminant is separated in step (b).

3. The method of claim 1 wherein all of the remainder of the withdrawn reaction mixture is returned to the liquid phase in the reactor vessel.

4. The method of claim 1 wherein at least a portion of the remainder of the withdrawn reaction mixture is discarded and replaced with an equivalent amount of fresh liquid and dissolved or solid reactants and returned to the liquid phase in the reactor vessel along with any non-discarded portion of the withdrawn reaction mixture.

5. The method of claim 1 wherein a contaminant is removed from the surface of the liquid phase.

6. The method of claim 5 wherein the withdrawn reaction mixture is collected and removed from the reactor vessel by skimming the surface of the liquid phase.

7. The method of claim 1 wherein a contaminant is removed from at least two locations in the liquid phase.

8. The method of claim 1 wherein a contaminant is removed from at least one point below the surface of the liquid phase.

9. The method of claim 8 wherein a contaminant is removed from the bottom of the reactor vessel.

10. The method of claim 1 wherein said portion of the reaction mixture is withdrawn from the reactor vessel continuously during the course of the reaction.

11. The method of claim 1 wherein said portion of the reaction mixture is withdrawn on an intermittent basis during the course of the reaction.

12. The method of claim 1 wherein said withdrawn portion of the reaction mixture containing said soluble and/or insoluble contaminants is diluted.

13. The method of claim 1 wherein said reaction mixture contains a dissolved catalytic agent or a dispersed solid catalytic agent.

14. The method of claim 13 wherein said contaminant is selected from the group consisting of urea-formaldehyde derivatives present in the dissolved urea, urea-formaldehyde oligomers, urea-formaldehyde polymers, methylol urea, dimethylol urea, trimethylol urea, urea-formaldehyde pre-condensates, hexamethylenetetramine, saponates, lignosulfonates, and mixtures thereof.

15. The method of claim 13 wherein said contaminant is a polyamide.

16. The method of claim 13 wherein an insoluble contaminant accumulates on the surface of the liquid phase and said insoluble contaminant is separated in step (b).

17. The method of claim 13 wherein all of the remainder of the withdrawn reaction mixture is returned to the liquid phase in the reactor vessel.

18. The method of claim 13 wherein at least a portion of the remainder of the withdrawn reaction mixture is discarded and replaced with an equivalent amount of fresh liquid and dissolved or solid reactants and returned to the liquid phase in the reactor vessel along with any non-discarded portion of the withdrawn reaction mixture.

19. The method of claim 13 wherein a contaminant is removed from the surface of the liquid phase.

20. The method of claim 19 wherein the withdrawn reaction mixture is collected and removed from the reactor vessel by skimming the surface of the liquid phase.

21. The method of claim 13 wherein a contaminant is removed from at least two locations in the liquid phase.

22. The method of claim 13 wherein a contaminant is removed from at least one point below the surface of the liquid phase.

23. The method of claim 22 wherein a contaminant is removed from the bottom of the reactor vessel.

24. The method of claim 13 wherein said portion of the reaction mixture is withdrawn from the reactor vessel continuously during the course of the reaction.

25. The method of claim 13 wherein said portion of the reaction mixture is withdrawn on an intermittent basis during the course of the reaction.

26. The method of claim 13 wherein said withdrawn portion of the reaction mixture containing said soluble and/or insoluble contaminants is diluted.

27. The method of claim 1 wherein said contaminant is selected from the group consisting of urea-formaldehyde derivatives present in the dissolved urea, urea-formaldehyde oligomers, urea-formaldehyde polymers, methylol urea, dimethylol urea, trimethylol urea, urea-formaldehyde pre-condensates, hexamethylenetetramine, saponates, lignosulfonates, and mixtures thereof.

28. The method of claim 1 wherein said contaminant is a polyamide.

29. In a method of continuously producing gaseous ammonia by hydrolysis of an aqueous urea solution, the improvement comprising providing an aqueous urea solution essentially free of contaminants, by continuously removing contaminants from said aqueous urea solution to comprise said aqueous urea solution for hydrolysis.

30. In the method of claim 29 wherein said contaminants are selected from the group consisting of methylene di-urea, urea-formaldehyde derivatives, urea-formaldehyde oligomers, urea-formaldehyde polymers, saponates, lignosulfonates, and mixtures thereof.

31. In the method of claim 29 wherein said contaminant is a polyamide.

* * * * *